tented Oct. 30, 1962

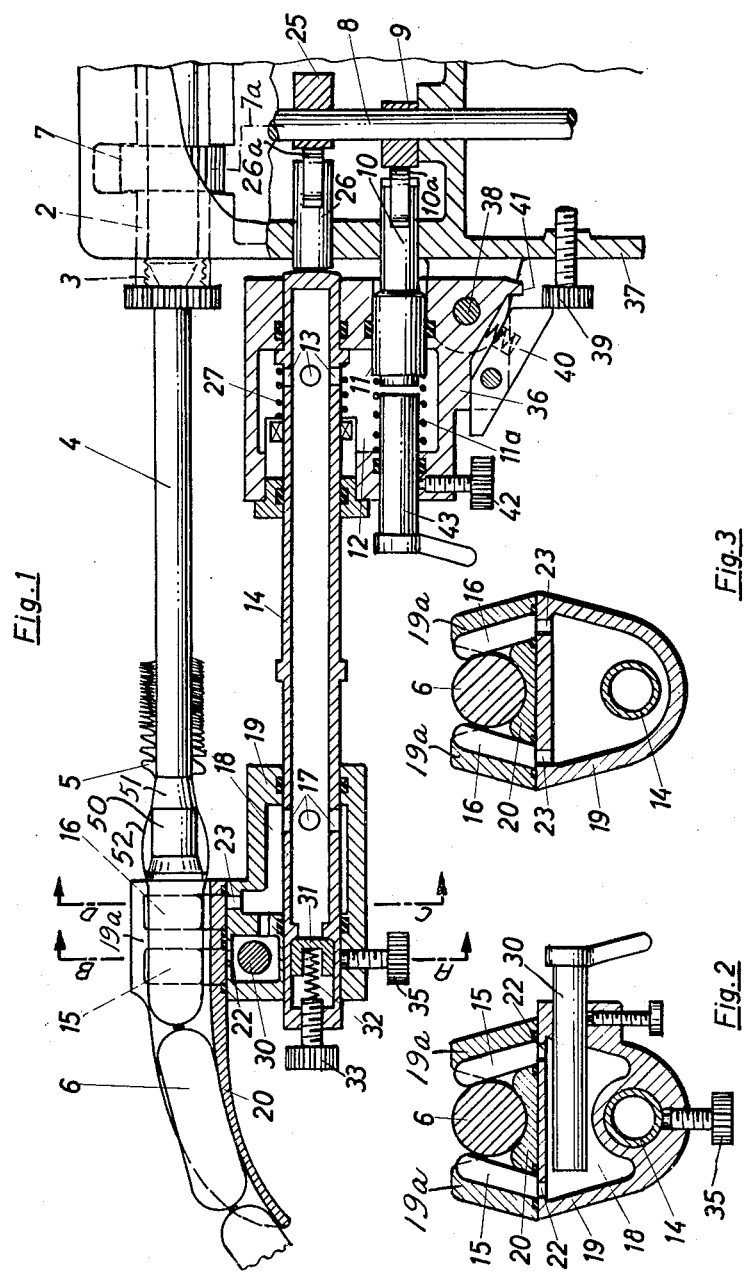

3,060,495
RESTRAINING DEVICE FOR APPORTION AND
TWIST-OFF SAUSAGE MACHINES
Johann Müller, Galmuthofen uber Biberach, Germany,
assignor to Albert Handtmann, Armaturenfabrik,
Biberach, Germany, a firm of Germany
Filed Nov. 18, 1959, Ser. No. 853,806
Claims priority, application Germany Jan. 7, 1959
10 Claims. (Cl. 17—33)

My invention relates to a restraining device for automatically holding filled sausage casings during the twisting-off operation of sausage-link making machines, and has for its main object to automate to a great extent the fabricating operation of such machines.

In the known machines of this type, the constriction between successive sausage portions or links is effected by imparting to the feeder nozzle tube, upon which a length of sausage casing is shoved, a number of revolutions each time an individual portion of sausage meat has passed through the nozzle tube into the casing. During such revolution the amount of casing that contains the portion last issued is customarily held fast by hand so that it cannot revolve. Such manual activity at the proper moment and in the proper manner requires experience and continuous attendance by personnel.

It is an object of my invention to improve such machines by reducing or eliminating the need for manual attendance and continuous supervision. Another object is to improve the products with respect to uniformity and to avoid or minimize defective products due to the variety, non-uniform qualities and sometimes great sensitivity of the sausage casings being used. Still another object is to considerably increase the operating speed of automatic sausage making machines.

According to my invention, in its broadest aspects, the human hand is substituted by an automatically operating restraining device which holds the individual portion or link of sausage just issued from the feeder nozzle of the machine at the correct moment required for obtaining a perfect twisting and constriction just behind that portion. As a result, the use of apportion and twist-off machines is greatly simplified and the links produced thereby become more uniform than heretofore possible. The difficulties expected from the provision of such an automatic restraining device because of the variety and sensitivity of various casing materials can be obviated, according to a more specific feature of my invention, by giving the restraining member of the device a performance similar to that of the human hand and to also provide for adjustability of the device.

According to a further, more specific feature of my invention the restraining device is provided with an elastic holder bellows or a plurality of bellows, shaped for gripping around the filled sausage casing and having its interior pressure space connected with a fluid pressure transmitter controlled in dependence upon the twist-off motion of the machine. Also according to my invention, the pressure transmitter comprises an air-pressure cylinder whose piston is axially displaceable in opposition to spring force and whose cylinder space communicates with the inner space of the holder bellows, the displacement of the piston being controlled by a cam driven from the drive or transmission that transmits twisting motion to the feeder nozzle tube.

These devices, cooperating with the novel bellows-type holder, afford restraining the last-filled portion of the sausage casing in the desired manner without entailing the danger of damaging the casing. The coupling of the holding operation with the drive for the twist-off tubes provides for constrained relation between these two operations which secures reliable performance even at high operating speeds.

In order to adapt the sequence of the above-mentioned operations to the performance of the sausage filling operation and for relieving the pressure imposed upon the last-filled portion, another feature of my invention provides a second control cam driven from the drive of the twist-off nozzle tube, which cam shifts the restraining device away from the outlet opening of the tube a distance smaller than the length of an individual sausage link. The control cams are so designed that the last filled sausage portion is still held by the restraining device when the latter is being displaced.

In apportioning and twist-off machines of the type here involved, the nozzle tube which carries the supply of sausage casing is exchangeable in accordance with the diameter of the finished product. To afford such exchangeability in machines improved according to the invention, the holder bellows, according to a further novel feature, are given an adjustable volume in order to adapt their holding width and force to the particular diameter of the sausage product. More specifically, I provide in the conduit for the pressure medium between the pressure source and the bellows a dead-volume chamber whose volume is variable by means of a displaceable piston. For the same purpose, the elasticity and holding force of the restraining device are made adjustable according to the invention by inserting into the pressure space communicating with the interior of the holder bellows, a device, for example a displaceable spring-biased piston, for changing the compressible volume.

The foregoing and more specific objects, advantages and features of my invention, said features being set forth with particularity in the claims annexed hereto, will be apparent from, and will be mentioned in, the following with reference to the embodiments of devices according to the invention illustrated by way of example on the accompanying drawings in which:

FIG. 1 is a longitudinal section through part of an apportioning and twist-off sausage machine and through a complete restraining device according to the invention;

FIG. 2 is a cross section along the line A—B in FIG. 1, showing the restraining device in holding condition;

FIG. 3 is a cross section along the line C—D in FIG. 1.

The design and operation of apportioning and twist-off machines is known as such and will be described hereinafter only to the extent necessary for describing and understanding the present invention. As regards machine details not essential to the invention proper and not illustrated or further described herein, reference may be had to my copending application Serial No. 809,305, filed April 27, 1959, now abandoned and in U.S. Patent 2,854,-689, issued October 7, 1958.

The normal operation of such machines is such that an adjustable volume of sausage meat is divided from the available supply and is forced through a control device through a nozzle-tube holder 2 of hollow cylindrical shape and thence through a twist-off nozzle tube 4, screwed or otherwise fastened at 3 onto the tube holder 2, from which the apportioned amount of meat passes into the sausage casing 5 shoved over the tube 4. After the entire apportioned amount 6 is forced into the casing 5 ahead of the delivering opening of tube 4, a sausage link is formed by twisting and constricting the casing 5 in front of the tube opening just behnid the filled portion. For this purpose, the nozzle holder 2 together with the tube 4 is driven by a spur gear 7 coaxially mounted on the holder 2. Several complete revolutions of holder 2 and tube 4 are required. During such revolution, the portion 6 must be held fast so that it cannot participate in the revolution of the tube 4 and of the amount of casing 5 located on the tube. As explained, such holding of portion 6 is effected according to the invention by an automatic restraining device.

The drive shaft 8 for the transmission means or spur gear 7 is at standstill while the portion 6 passes from the tube 4 into the casing. The mechanical connection between shaft 8 and gear 7 is diagrammatically indicated in FIG. 1 as 7a. The shaft 8 carries a control cam 9. During twisting operation, the shaft 8 performs a single full revolution during which the cam 9 acts through a roller 10a upon a pusher member or tappet 10 which pushes a pressure transmitting piston 11 toward the left at the beginning of the twisting. This axial displacement of piston 11 reduces the volume in an air chamber 12, sealed off from the outside, so that the pressure therein is increased to force air through openings 13 and into a carrier pipe 14 extending into the pressure chamber 18. The pipe 14 communicates through openings 17 with the pressure chamber 18 of a supporting structure 19. The chamber 18 communicates with the interior of two inflatable bellows 15 and 16. The support or table 19 is provided with a supporting trough 20 having a shape adapted to accommodate approximately the diameter of the sausages or sausage links issuing from the nozzle tube 4. Walls 19a, fastened to table or support 19 as shown in FIG. 1, surround the bellows 15, 16 over an external angle of at least 180° The bellows 15 and 16 communicate with chamber 18 through respective channels 22 and 23 and are mounted on the upper cover structure of the support 19. The bellows are so shaped that they elastically grip around the filled sausage casing in the manner of the human hand. When inflated the bellows thus hold the filled sausage portion and restrain it from participating in the revolution of the tube 4. This operating condition is represented in FIGS. 1, 2 and 3.

When the sausage portion is completely twisted, and prior to delivery of the next quantity of sausage meat, the shaft 8 with cam 9 has turned to such an extent that the pressure transmitter piston 11 can be displaced by a spring 11a toward the right, thus reducing the inner pressure of the bellows 15, 16 for deflating them. Another quantity of apportioned sausage meat can now flow without hindrance from tube 4 into the casing.

When the casings are too tightly filled, the twisting operation may not result in the desired perfect constriction at the twist-off point. For avoiding such trouble, the location of the filled casing at the delivery end of the nozzle tube which is to become constricted during twisting must be relieved from excessive pressure by the sausage meat when a quantity of meat is completely delivered into the casing and just prior to performance of the twisting operation. This is done by displacing the filled casing away from the tube end a distance smaller than the length of an individual sausage portion or link. For this purpose the shaft 8 is provided with another control cam 25 which acts through a collar 26a and a tappet 26 to impart to the carrier pipe 14 the desired displacement to the left in opposition to the action of a return spring 27. As shown in FIG. 1, the pipe 14 is slidable on suitable guide means which support it in housing 36. The two control cams 9 and 25 are so designed that the sausage portion previously filled is still held by the bellows 15, 16 of the restraining device during the displacement of pipe 14 to the left, so that the sausage portion is also moved away from the end of nozzle tube 4. After the portion is completely twisted off, the cam 25 will have turned to a position in which the tappet 10 can move toward the right, and the pipe 14 is then returned to the illustrated starting position by the force of spring 27.

For fabrication of sausage casings of respectively different diameters, the nozzle tube 4 can be unscrewed from the holder 2 at the threaded portion 3 and can be substituted by nozzle tubes of different diameter. The action of the retaining bellows 15, 16 can be adapted to the particular sausage diameter by means of an adjustable piston 30. For example, when using a nozzle tube of smaller diameter, the volume of pressure chamber 18 is correspondingly reduced by displacing the piston 30 in support 19 into the chamber. As a result, the holding width of the bellows is reduced so that the holding action commences immediately when the twisting operation is started. When using nozzle tubes of greater diameter, the piston 30 is correspondingly pulled out in order to obtain the proper increase in volume of chamber 18.

The force with which the bellows 15, 16 engage the filled casing and hence the elasticity of the restraining device is adjustable by means of a piston 31 which is loaded by a spring 32 and is likewise displaceable in the pressure chamber 18. The pressure control device, comprising the piston 31, the spring 32 and the set screw 33, permits varying the pressure which becomes adjusted in chamber 18. This adjustment is accomplished because the piston 31 is more or less loaded by the pre-compression of spring 32. The spring 32 is pre-compressed an amount adjustable by means of a set screw 33, so that when the piston 11 shifts to the left it displaces a corresponding volume of air from chamber 12 which flows out through the openings 13, the tube 14, through the openings 17 and into the space 18. This volume of air causes a pressure increase, which is propagated from chamber 18 through the bores 22, 23 into the holder bellows 15, 16. This volume of air, and consequently the resulting pressure applied to the bellows 15, 16, is influenced by the force of spring 32, which can be adjusted by turning screw 33.

The suitable volume in pressure chamber 12 can be adjusted by means of a spring-biased piston 43 which is displaceable in the housing body 36 of the chamber and can be fastened in the selected proper position by means of a screw bolt 42. If necessary for disassembly, the support 19 with the holder bellows 15, 16 can be removed from the carrier pipe 14 after loosening a set screw 35. To permit pushing the casing onto the nozzle tube 4 without hindrance, the housing structure 36, containing the pressure chamber 12 and holding the carrier pipe 14, is tiltable relative to the frame structure 37 of the machine about a pivot pin 38 and can be fixed in its proper position by means of a set screw 39 acting upon a resiliently pivoted latch 40. The entire restraining device can thus be adjusted in position with respect to the nozzle tube 4 and can be turned downwardly until a stop 41 of housing body 36 abuts against the machine frame structure 37.

In cases where the restraining device is not required for the operation of the sausage making machine, for example when it is desired to perform the twisting off operation by hand in the conventional manner, the pivot pin 38 can be pulled out of its seat whereafter the entire restraining device can be removed.

The nozzle tube 4 is preferably provided with a filler head or nozzle 50 which forms an extension of the tube. The filler head is provided with a frusto-conical portion 51 adjacent to the tube 4. The smallest diameter of the cone 51 corresponds substantially to the diameter of the tube 4 upon which the supply of casing material 5 is located.

The restraining device according to the invention is also applicable with sausage tying machines in which a string is tied about the twisted-off and constricted sausage ends.

It will be obvious to those skilled in the art, upon studying this disclosure, that my invention permits of various modifications with respect to design details and hence may be given embodiments other than particularly illustrated and described herein, without departing from the essential features of my invention and within the scope of the claims annexed hereto.

I claim:

1. In a sausage-link producing machine of the apportioning and twisting-off type, a filler nozzle from which the sausage casing is supplied, a device for holding and advancing stuffed sausage casings in the form of sausage links, said holding device comprising elastic bellows means shaped for enclosing and holding a filled sausage link, a pressure transmitter connected with the interior of said bellows means for controlling the bellows holding action to inflated holding and deflated releasing conditions, and transmission means for imparting twisting motion to said filler nozzle while said bellows means are in said deflated condition, said transmission means being connected with said pressure transmitter for moving in synchronization with the latter.

2. A device according to claim 1, including drive means for imparting rotary motion to said transmission means, a control cam operably connected with said drive means, said pressure transmitter being provided with pusher member and a piston axially displaceable in a predetermined direction in response to pressure from said pusher member, biasing means urging said piston axially in opposition to said predetermined direction, said pusher member abutting against said cam to be controlled thereby, a housing body forming a cylinder in which said piston is displaceably supported, said housing body having an inner space communicating with the interior of said bellows means.

3. A device according to claim 2 and including a second control cam operably connected with said drive means, said bellows means being mounted for axial displacement away from said twisting nozzle, and means connecting said bellows means with said second control cam for displacing said bellows means away from said nozzle a distance smaller than the length of a filled sausage link.

4. A device according to claim 3, said respective first and second control cams having control surfaces so formed and cooperating respectively with said twisting nozzle and said bellows means so that the filled sausage link is still held by said bellows means during said axial displacement of the latter, whereby said filled sausage link is moved away from said nozzle.

5. A device according to claim 1, said pressure transmitter including pressure supply means for supplying a pressure medium to said bellows means, a supporting structure for said bellows means forming a pressure chamber and interposed between and communicating with said pressure supply means and the interior of said bellows means, an adjustable piston displaceably located within said chamber for varying the chamber volume and thus adapting the holding width of said bellows means to the diameter of the sausage link being produced.

6. A device according to claim 2, including a displaceable spring-biased piston slidably and adjustably disposed within said housing body, said latter spring-biased piston being operably connected to said pressure transmitter for adjusting the elasticity and holding force of said bellows means.

7. A device according to claim 5, said pressure supply means comprising a supporting pipe on which said supporting structure is slidably mounted, a table for supporting filled sausage links mounted on said supporting pipe, a second control cam operably connected with said drive means, said pipe being operably connected for displacement by said second control cam, a housing body and guide means within said housing body for guiding said pipe during axial movement of the latter, the displacement of said pipe and table being in a predetermined direction axial and parallel to said nozzle, and biasing means for urging said pipe in a direction in opposition to said predetermned direction.

8. A device according to claim 7, said table for supporting the filled sausage links forming a trough having a shape adapted approximately to the diameter of one of said sausage links, said table being provided with walls surrounding said holding bellows means over external angle of at least 180°.

9. A device according to claim 7, said housing body including pivoting means for pivotally mounting said housing to the sausage machine, said pivoting means being removable for adjusting the height of said supporting table.

10. In a sausage-link producing machine of the apportioning and twisting-off type, a twistable filler nozzle from which the sausage casing is supplied, a device for holding and advancing a chain of stuffed sausage casings in the form of sausage links, said holding device comprising elastic bellows means rapidly expandable for enclosing and frictionally holding a filled sausage link along a predetermined length of the latter during the twisting of said nozzle and rapidly contractable to release said sausage link during the advance of said chain of sausages, pressure transmitter connected with the interior of said bellows means for controlling the frictional holding action, drive means having transmission means for imparting the twisting motion to said filler nozzle to seal off the end of a filled sausage link, said transmission means being connected wtih said pressure transmitter for controlling the latter in synchronization with the twisting motion of the nozzle, a control cam operably connected with said drive means, said pressure transmitter being provided with a piston axially displaceable by said control cam in a predetermined direction in response to movement of said cam, biasing means urging said piston axially in opposition to said predetermined direction, a housing body forming a cylinder in which said piston is displaceably supported, said housing body having an inner space communicating with the interior of said bellows means, whereby said bellows means periodically expands to engage successive sausage links along said predetermined length of each to hold the link fast during twisting of said nozzle due to the increased frictional effect produced in said bellows by pressure from said pressure transmitter, and whereby said bellows means then is contracted to decrease the friction of said sausage-engaging surface for advancing of the chain of sausage links.

References Cited in the file of this patent

UNITED STATES PATENTS

| | | |
|---|---|---|
| 1,510,063 | Kertes | Sept. 30, 1924 |
| 1,610,008 | Hirsch | Dec. 7, 1926 |
| 1,759,587 | Parker | May 20, 1930 |
| 2,784,997 | Baumann | Mar. 12, 1957 |